(12) United States Patent
Joo (10) Patent No.: US 9,330,308 B2
(45) Date of Patent: May 3, 2016

(54) APPARATUS METHOD AND COMPUTER-READABLE MEDIUM THAT DETECTS DIFFERENT REGIONS OF USER'S HAND FOR RECOGNIZING GESTURE FOR CARRYING OUT OPERATION OF VEHICLE

(71) Applicant: Hyundai Motor Company, Seoul (KR)

(72) Inventor: Sihyun Joo, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/515,065

(22) Filed: Oct. 15, 2014

(65) Prior Publication Data

US 2015/0186707 A1 Jul. 2, 2015

(30) Foreign Application Priority Data

Dec. 31, 2013 (KR) .................. 10-2013-0168913

(51) Int. Cl.
*G06K 9/00* (2006.01)
(52) U.S. Cl.
CPC .................... *G06K 9/00389* (2013.01)
(58) Field of Classification Search
None
See application file for complete search history.

(56) References Cited

U.S. PATENT DOCUMENTS

| | | | | |
|---|---|---|---|---|
| 5,454,043 A * | 9/1995 | Freeman | ............... | A61B 5/1121 345/419 |
| 7,340,077 B2 * | 3/2008 | Gokturk | .................. | G06F 3/017 348/208.14 |
| 9,042,606 B2 * | 5/2015 | Bebis | ................. | G06K 9/00375 382/115 |
| 2005/0286744 A1 * | 12/2005 | Yoshizu | .................... | G06K 9/00 382/115 |
| 2006/0136846 A1 * | 6/2006 | Im | ........................... | G06F 3/017 715/863 |
| 2010/0329511 A1 * | 12/2010 | Yoon | .................. | G06K 9/00382 382/103 |
| 2011/0169934 A1 * | 7/2011 | Pulluru | ................... | G06F 21/32 348/77 |
| 2012/0235903 A1 * | 9/2012 | Im | .......................... | G06F 3/005 345/158 |
| 2014/0300542 A1 * | 10/2014 | Jakubiak | ................. | G06F 3/017 345/157 |
| 2015/0186707 A1 * | 7/2015 | Joo | .................... | G06K 9/00389 382/103 |

FOREIGN PATENT DOCUMENTS

KR 10-2011-0104214 A 9/2011

OTHER PUBLICATIONS

Ahn, Ha-eun et al., "Finger Shape Recognition Algorithm in Geometrical Ways", Kwangwoon Unversity, pp. 742-743 with English Abstract.
Shin, Jeong Hoon "Finger Counting Using Computer Vision", Sungkyunkwan University, pp. 657-658 with English Abstract.

* cited by examiner

*Primary Examiner* — Tahmina Ansari
(74) *Attorney, Agent, or Firm* — Mintz Levin Cohn Ferris Glovsky and Popeo, P.C.; Peter F. Corless (57) ABSTRACT

An apparatus for recognizing a user's gesture for carrying out an operation of a vehicle may include: an image generator that generates an object image by photographing a user's hand; a feature point candidate detector that generates a hand image including a hand region by eliminating a background of the object image; a palm detector that detects a palm region by performing a morphology operation on the hand region; a finger detector that detects a finger region by eliminating the palm region from the hand region; a feature point detector that detects the finger valleys located within the palm region and the fingertips located within the finger region as feature points; and a gesture recognizer that recognizes a number of unfolded fingers based on the hand model, and recognizes the user's gesture by selecting a category that corresponds to the number of unfolded fingers among a plurality of categories.

14 Claims, 7 Drawing Sheets

APPARATUS METHOD AND COMPUTER-READABLE MEDIUM THAT DETECTS DIFFERENT REGIONS OF USER'S HAND FOR RECOGNIZING GESTURE FOR CARRYING OUT OPERATION OF VEHICLE

CROSS-REFERENCE TO RELATED APPLICATION

This application claims under 35 U.S.C. §119(a) priority to and the benefit of Korean Patent Application No. 10-2013-0168913 filed in the Korean Intellectual Property Office on Dec. 31, 2013, the entire contents of which are incorporated herein by reference.

BACKGROUND (a) Field of the Invention

The present invention relates to an apparatus and a method for recognizing a user's gesture for operating a vehicle or a vehicle component, and thus can carry out an operation of the vehicle.

(b) Description of the Related Art

Generally, an information technology device for a vehicle is a device that provides assistance for driving of the vehicle or convenience and entertainment of a user such as a driver. For example, the information technology device includes an audio device, an audio video navigation system, a telematics device, and the like.

Some of the information technology devices are controlled by a remote control method in order to prevent a driver's eyes from deviating from a road in front of the vehicle.

As the remote control method, there is a method for controlling the information technology devices by using a button disposed on a steering wheel of the vehicle or recognizing a user's gesture. Among those, the method for recognizing a user's gesture is a method of photographing a user's hand by a camera and recognizing a hand pose based on the photographed image.

However, according to the conventional method for recognizing the user's gesture, a gesture recognition rate is deteriorated as the number of available hand poses is increased.

The above information disclosed in this Background section is only for enhancement of understanding of the background of the invention and therefore it may contain information that does not form the prior art that is already known in this country to a person of ordinary skill in the art.

SUMMARY

The present invention provides an apparatus and a method for recognizing a user's gesture for carrying out an operation of a vehicle having advantages of detecting feature point candidates based on a curvature of an outline of a user's hand, and precisely detecting feature points by filtering the feature point candidates.

An apparatus for recognizing a user's gesture for carrying out an operation of a vehicle according to an exemplary embodiment of the present invention may include: an image generator configured to generate an object image by photographing a user's hand; a feature point candidate detector configured to generate a hand image including a hand region by eliminating a background of the object image, and detect a center point of a wrist and feature point candidates including fingertips and finger valleys; a palm detector configured to detect a palm region by performing a morphology operation on the hand region, and detect a center point of the palm region; a finger detector configured to detect a finger region by eliminating the palm region from the hand region; a feature point detector configured to detect the finger valleys located within the palm region and the fingertips located within the finger region as feature points, and generate a hand model by using the center point of the wrist, the center point of the palm region, and the feature points; and a gesture recognizer configured to recognize a number of unfolded fingers based on the hand model, and recognize the user's gesture by selecting a category that corresponds to the number of unfolded fingers among a plurality of categories.

The feature point candidate detector may convert the hand image to a binary image.

The feature point candidate detector may normalize the hand region after converting the hand image to the binary image or after detecting the feature point candidates.

The feature point candidate detector may detect an outline of the user's hand, and detect the fingertips or the finger valleys based on a curvature of the outline of the user's hand.

The feature point candidate detector may detect points where the curvature is greater than a predetermined value as the fingertips or the finger valleys.

The palm detector may perform an erosion operation along the outline of the user's hand to eliminate the finger region, perform a dilation operation along an outline of the palm region remaining after being partially eliminated by the erosion operation to dilate the palm region, and detect a center point of the dilated palm region by using an ellipse matching method or a least squares method.

The finger detector may detect the finger region by eliminating the dilated palm region from the hand region.

The feature point detector may detect the feature point candidates located within the palm region or the finger region by primarily filtering the feature point candidates.

The feature point detector may detect the feature points by secondarily filtering the primarily filtered feature point candidates based on distances and angles between the center point of the wrist, the center point of the palm region, and the primarily filtered feature point candidates.

The gesture recognizer may select a hand pose that corresponds to the hand model in the selected category.

A method for recognizing a user's gesture for carrying out an operation of a vehicle according to an exemplary embodiment of the present invention may include: generating a hand image by eliminating a background of an object image; converting the hand image to a binary image including a hand region; detecting a center point of a wrist and feature point candidates including fingertips and finger valleys within the hand region; detecting a palm region and a center point of the palm region by performing a morphology operation on the hand region; detecting a finger region by eliminating the palm region from the hand region; detecting the feature point candidates located within the palm region or the finger region by primarily filtering the feature point candidates; detecting feature points by secondarily filtering the primarily filtered feature point candidates based on distances and angles between the center point of the wrist, the center point of the palm region, and the primarily filtered feature point candidates; and generating a hand model by using the center point of the wrist, the center point of the palm region, and the feature points.

The method may further include normalizing the hand region after the converting the hand image to the binary image or after the detecting the center point of the wrist and feature point candidates.

The detecting the center point of the wrist and the feature point candidates may include detecting an outline of a user's hand and calculating a curvature of the outline of the user's hand.

The detecting the center point of the wrist and the feature point candidates may further include detecting points where the curvature is greater than a predetermined value as the fingertips or the finger valleys.

The detecting the palm region and the center point of the palm region by performing the morphology operation on the hand region may include: performing an erosion operation along the outline of the user's hand to eliminate the finger region; performing a dilation operation along an outline of the palm region remaining after being partially eliminated by the erosion operation to dilate the palm region; and detecting the center point of the dilated palm region by using an ellipse matching method or a least squares method.

The detecting the finger region may include eliminating the dilated palm region from the hand region.

The method may further include: recognizing a number of unfolded fingers based on the hand model; selecting a category that corresponds to the number of unfolded fingers among a plurality of categories; and recognizing the user's gesture by selecting a hand pose that corresponds to the hand model in the selected category.

According to an exemplary embodiment of the present invention, the feature point candidates are detected based on the curvature of the outline of the user's hand, and the feature points can be precisely detected by filtering the feature point candidates.

Further, a recognition rate of the user's gesture can be improved by classifying categories of the hand poses according to the number of unfolded fingers.

A non-transitory computer readable medium contains program instructions executed by a processor or controller, and may include: program instructions that generate a hand image by eliminating a background of an object image; program instructions that convert the hand image to a binary image including a hand region; program instructions that detect a center point of a wrist and feature point candidates including fingertips and finger valleys within the hand region; program instructions that detect a palm region and a center point of the palm region by performing a morphology operation on the hand region; program instructions that detect a finger region by eliminating the palm region from the hand region; program instructions that detect the feature point candidates located within the palm region or the finger region by primarily filtering the feature point candidates; program instructions that detect feature points by secondarily filtering the primarily filtered feature point candidates based on distances and angles between the center point of the wrist, the center point of the palm region, and the primarily filtered feature point candidates; and program instructions that generate a hand model by using the center point of the wrist, the center point of the palm region, and the feature points.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. In addition, when it is described that an element is "coupled" to another element, the element may be "directly coupled" to the other element or "electrically coupled" to the other element through a third element.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the present invention will be described more fully with reference to the accompanying drawings, in which exemplary embodiments of the invention are shown.

Figure 1:
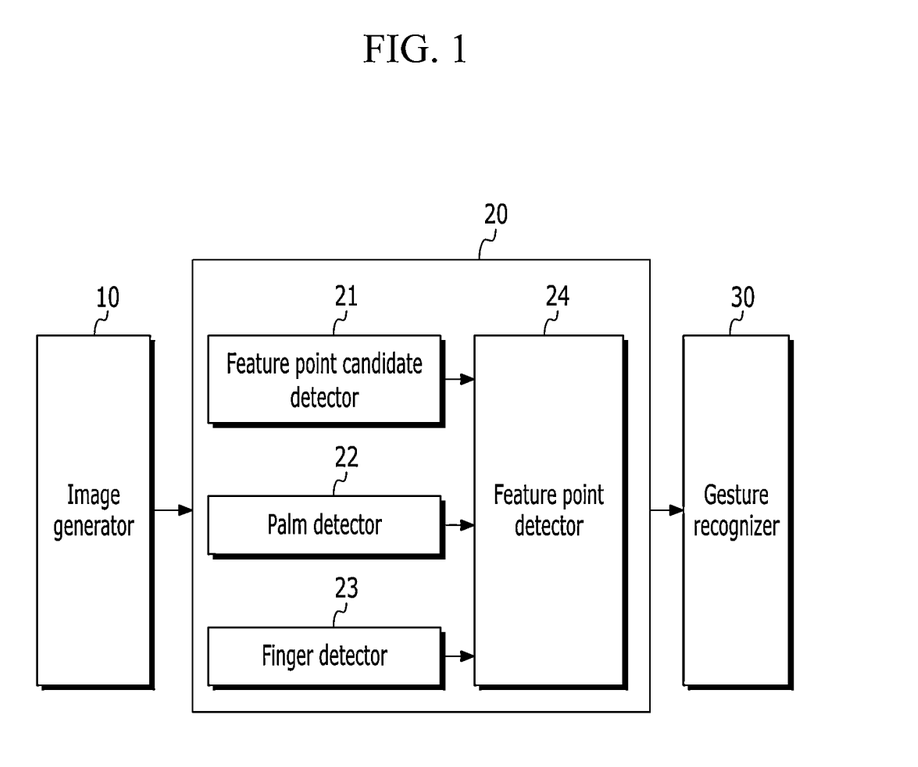
FIG. 1 is a block diagram of an apparatus for recognizing a user's gesture according to an exemplary embodiment of the present invention.
Figure 2:
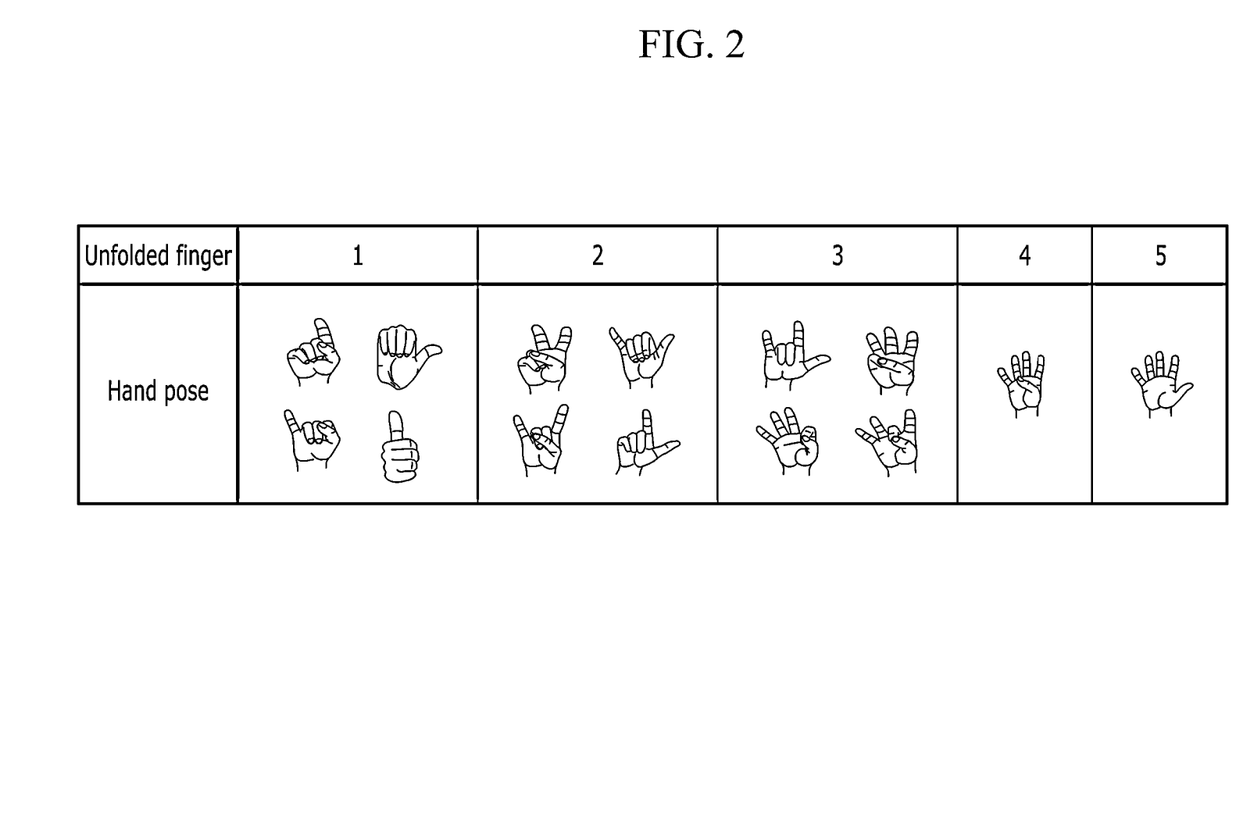
FIG. 2 is a schematic drawing for describing hand poses that are classified depending on the number of unfolded fingers according to the exemplary embodiment of the present invention.

FIG. 1 is a block diagram of an apparatus for recognizing a user's gesture according to an exemplary embodiment of the present invention, and FIG. 2 is a schematic drawing for describing hand poses that are classified depending on the number of unfolded fingers according to the exemplary embodiment of the present invention.

As shown in FIG. 1, an apparatus for recognizing a user's gesture according to an exemplary embodiment of the present invention may include an image generator 10, a hand model generator 20, and a gesture recognizer 30.

The image generator 10 generates an object image by photographing a user's hand. The image generate 10 may be a 2D camera, a 3D camera, or an infrared camera disposed to face the user's hand.

The hand model generator 20 may be implemented with one or more microprocessors executed by a predetermined program. The predetermined program may include a series of commands for performing each step included in a method for recognizing a user's gesture according to an exemplary embodiment of the present invention. By recognizing the user's gesture, it is possible to operate one or more components of a vehicle, or drive the vehicle.

The hand model generator 20 may include a feature point candidate detector 21, a palm detector 22, a finger detector 23, and a feature point detector 24.

The feature point candidate detector 21 generates a hand image by eliminating a background of the object image. The feature point candidate detector 21 detects feature point candidates from the hand image. The feature point candidates may include fingertips and finger valleys.

In detail, the feature point candidate detector 21 converts the hand image to a binary image. The feature point candidate detector 21 detects a wrist and a center point of the wrist. The feature point candidate detector 21 may divide the binary image into an upper region and lower region, and detect the wrist within the lower region.

The feature point candidate detector 21 detects an outline of the user's hand and calculates a curvature of the outline of the user's hand. The feature point candidate detector 21 may detect points where the curvature is greater than a predetermined value as the feature point candidates (fingertips or finger valleys).

The feature point candidate detector 21 may normalize a hand region that is included within the hand image. Since hand sizes are different for each user, hand regions that are included hand images may be different from each other in size. The normalization may be performed after converting the hand image to the binary image or after detecting the feature point candidates.

The palm detector 22 detects a palm region from the hand region, and detects a center point of the palm region. Herein, the palm detector 22 may detect the palm region by performing a morphology operation on the hand region. In detail, the palm detector 22 eliminates a finger region by performing an erosion operation. The palm detector 22 may eliminate the finger region along the outline of the user's hand. Since the finger region is smaller than the palm region, the palm region may detected by eliminating the finger region from the hand region.

The palm detector 22 dilates the palm region by performing a dilation operation on the palm region remaining after the elimination of the finger region. The palm detector 22 detects the center point of the dilated palm region.

Herein, the center point of the palm region may be detected by using an ellipse matching method or a least squares method. The ellipse matching method matches the palm region and an ellipse, and detects the center point of the ellipse as the center point of the palm region. Since the least squares method is well known and can be easily performed by a person of ordinary skill in the art, a detailed description thereof will be omitted. The palm detector 22 may perform a process for smoothing the outline of the dilated palm region.

The finger detector 23 detects the finger region by eliminating the palm region, which is detected from the palm detector 22, from the hand region.

The feature point detector 24 primarily filters the feature point candidates. The feature point detector 24 excludes feature point candidates, which are not located within the palm region or the finger region, from the feature point candidates. The feature point detector 24 secondarily filters the primarily filtered feature point candidates by analyzing a correlation between the center point of the wrist, the center point of the palm region, and the primarily filtered feature point candidates.

Herein, the feature point detector 24 may secondarily filter the primarily filtered feature point candidates by comparing distances and angles between the center point of the wrist, the center point of the palm region, and the primarily filtered feature point candidates. The feature point detector 24 may exclude one or more corresponding feature point candidates if the distances and angles between the center point of the wrist, the center point of the palm region, and the primarily filtered feature point candidates are out of predetermined ranges.

The feature point detector 24 detects the secondarily filtered feature point candidates as feature points. The feature point detector 24 generates a hand model by using the feature point points.

The gesture recognizer 30 recognizes a number of unfolded fingers based on the hand model, and selects a category that corresponds to the number of unfolded fingers among a plurality of categories. Herein, as shown in FIG. 2, the plurality of categories may be classified depending on the number of unfolded fingers and include information regarding predetermined hand poses. The gesture recognizer 30 recognizes a user's gesture by selecting a hand pose that corresponds to the hand model among the hand poses in the selected category.

The gesture recognizer 30 may control operations of information technology devices in the vehicle according to the recognized user's gesture. For example, the gesture recognizer 30 may control a volume of an audio device or a temperature of an air conditioner according to the recognized user's gesture.

Figure 3:
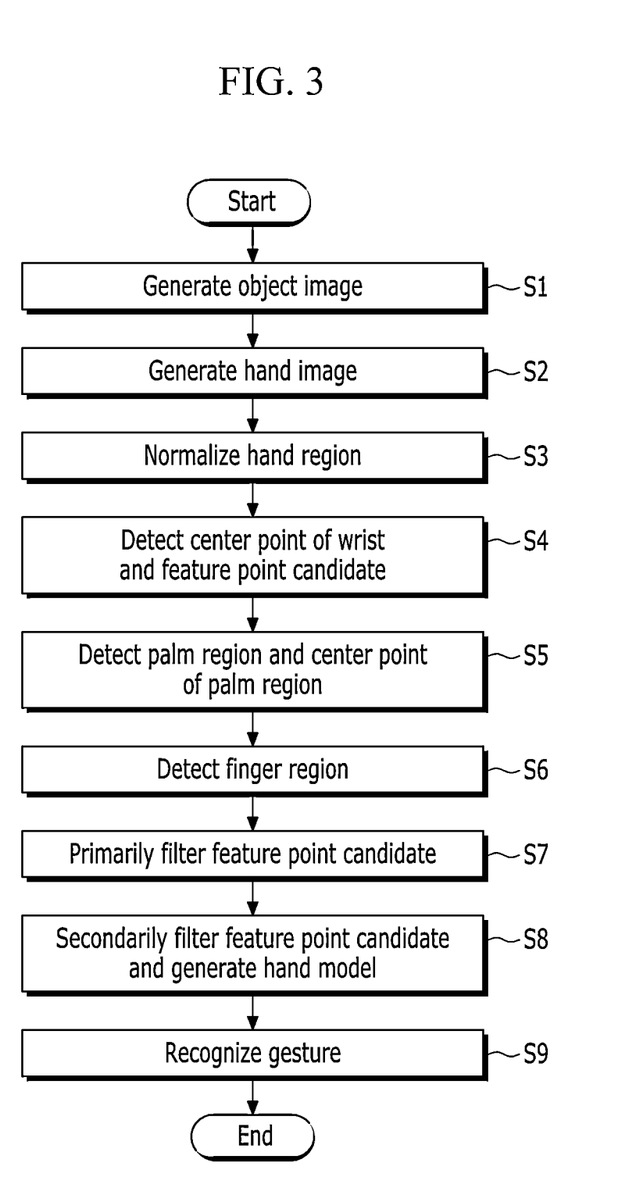
FIG. 3 is a flowchart of a method for recognizing a user's gesture according to the exemplary embodiment of the present invention.

FIG. 3 is a flowchart of a method for recognizing a user's gesture according to an exemplary embodiment of the present invention, and FIGS. 4 to 9 are schematic drawings for describing a method for recognizing a user's gesture according to the exemplary embodiment of the present invention.

Figure 4:
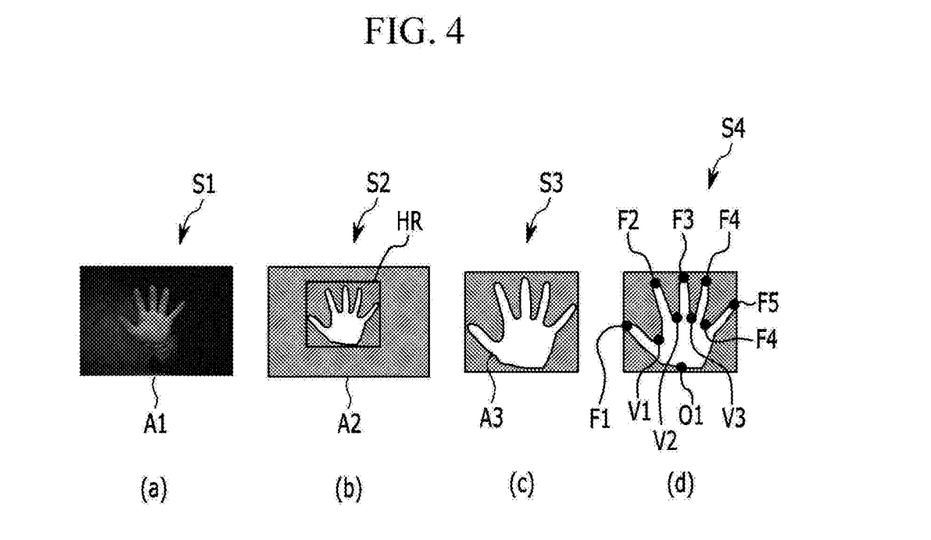
FIGS. 4 to 9 are schematic drawings for describing a method for recognizing a user's gesture according to the exemplary embodiment of the present invention.

As shown in FIG. 3 and FIG. 4 (a), the image generator 10 generates an object image A1 at step S1. The object image A1 is transmitted to the feature point candidate detector 21.

The feature point candidate detector 21 generates a hand image by eliminating a background of the object image A1 at step S2. The feature point candidate detector 21 converts the hand image to a binary image A2. The binary image A2 includes a hand region HR.

After that, the feature point candidate detector 21 normalizes the hand region HR at step S3. That is, the hand region HR is adjusted to have a predetermined size by the normalizing.

The feature point candidate detector 21 detects a center point O1 of a wrist within the normalized hand region A3 at step S4.

The feature point candidate detector 21 detects an outline of the user's hand and calculates a curvature of the outline of the user's hand. The feature point candidate detector 21 may detect one or more feature point candidates based on the curvature of the outline at the step S4. Points where the curvature is greater than a predetermined value may be detected as the feature point candidates. As shown in FIG. 4 (d), finger tips μ1 to F5 and finger valleys V1 to V4 may be detected as the feature point candidates.

Figure 5:
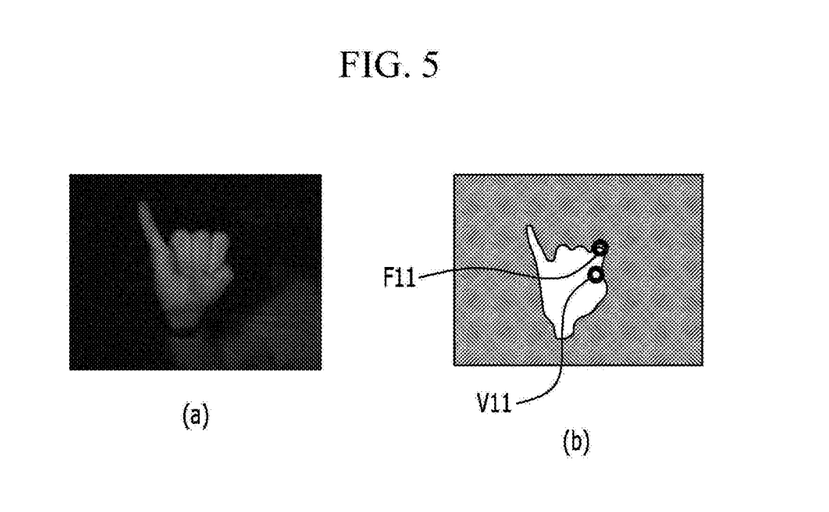

In this case, the feature point candidate detector 21 may mistakenly detect a point such as F11 or V11 as the feature point candidate as shown in FIG. 5. That is, the point F11 may be mistakenly detected as a fingertip and the point V11 may be mistakenly detected as a finger valley. Accordingly, the following process is performed to exclude the mistakenly detected point.

Figure 6:
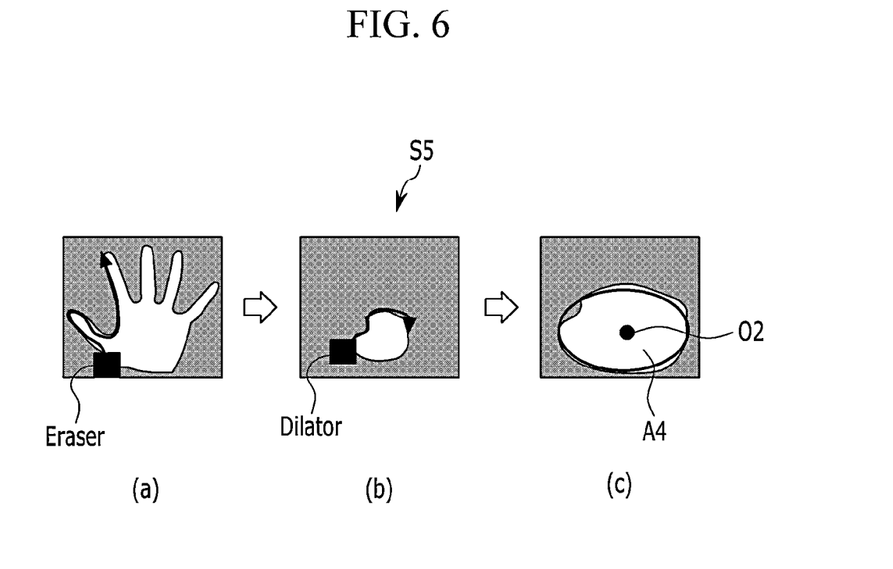

As shown in FIG. 6, the palm detector 22 may detect a palm region A4 by performing the morphology operation on the hand region A3 at step S5. The morphology operation includes the erosion operation and the dilation operation.

In detail, the palm detector 22 eliminates a finger region along the outline of the user's hand by performing the erosion operation as shown in FIG. 6 (a).

After that, the palm detector 22 performs the dilation operation along the outline of the palm region remaining after being partially eliminated by the erosion operation as shown in FIG. 6 (b). Then, the palm region is dilated as shown in FIG. 6 (c). After that, the palm detector 22 detects a center point O2 of the dilated palm region A4 by using the ellipse matching method or the least squares method at the step S5.

Figure 7:
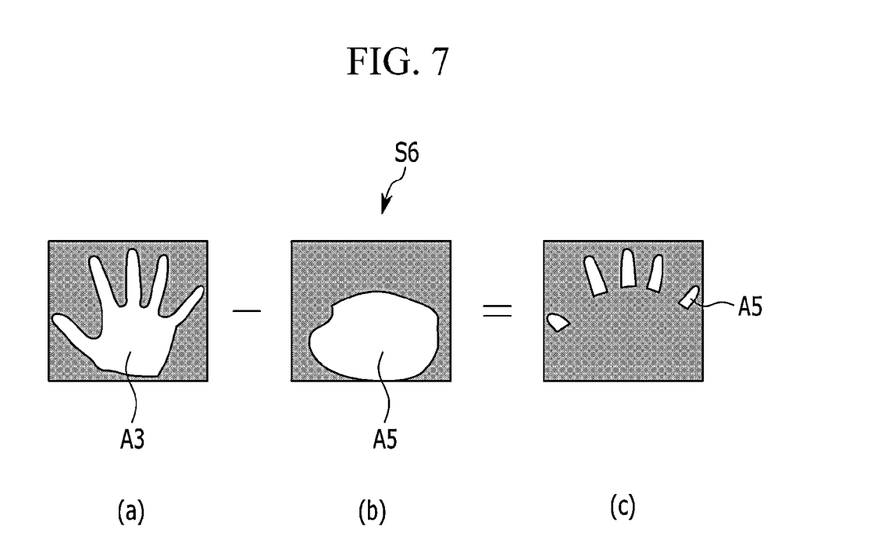

As shown in FIG. 7, the finger detector 23 detects a finger region A5 by eliminating the dilated palm region A4 from the normalized hand region A3 at step S6.

The feature point detector 24 primarily filters the feature point candidates at step S7. That is, the feature point detector 24 detects the feature point candidates located within the palm region A4 or the finger region A5.

Figure 8:
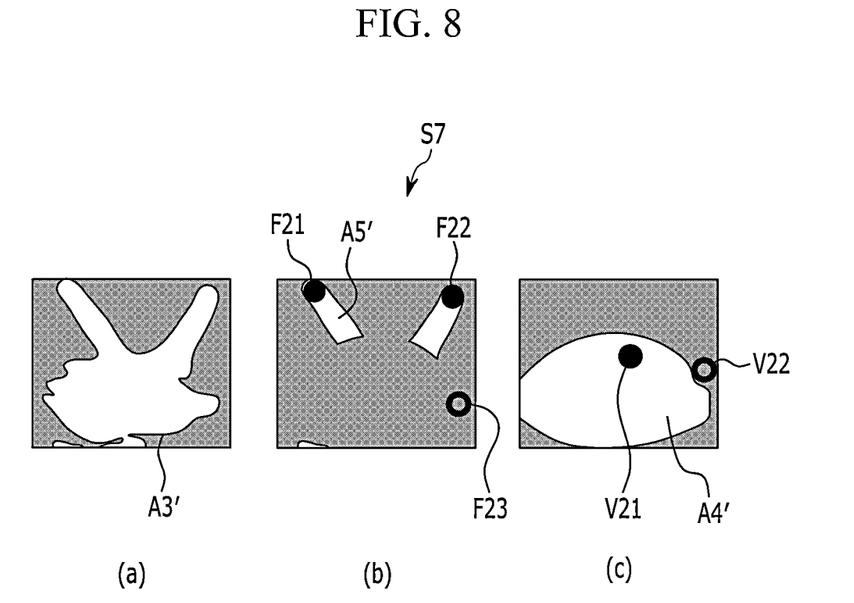

For example, as shown in FIG. 8, points F21, F22, and F23 in a hand region A3' may be detected as the feature point candidates (fingertips). In this case, since the point F23 is not located within a finger region A5', the feature point detector 25 excludes the point F23 from the feature point candidates.

Points V21 and V22 in the hand region A3' may be detected as the feature point candidates (finger valleys). In this case, since the point V22 is not located within a palm region A4', the feature point detector 24 excludes the point V22 from the feature point candidates.

Figure 9:
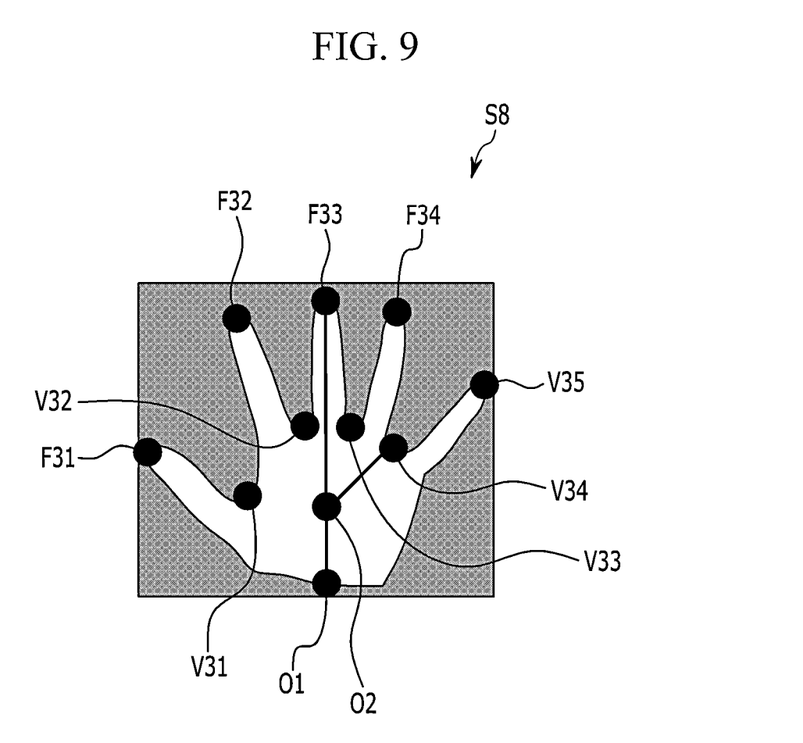

After that, as shown in FIG. 9, the feature point detector 24 secondarily filters the primarily filtered feature point candidates by comparing distances and angles between the center point O1 of the wrist, the center point O2 of the palm region, and the primarily filtered feature point candidates at step S8. Accordingly, fingertips F31 to F35 and finger valleys V31 to V34 are detected as the feature points.

The feature point detector 24 generates a hand model by using the center point O1 of the wrist, the center point O2 of the palm region, and the feature points F31 to F35 and V31 to V34.

After that, the gesture recognizer 30 recognizes the number of unfolded fingers based on the hand model, and selects a category that corresponds to the number of unfolded fingers among a plurality of categories. The gesture recognizer 30 recognizes a user's gesture by selecting a hand pose that corresponds to the hand model among the hand poses in the selected category at step S9.

As described above, according to an exemplary embodiment of the present invention, the feature point candidates are detected based on the curvature of the outline of the user's hand, and the feature points can be precisely detected by filtering the feature point candidates.

Further, the recognition rate of the user's gesture can be improved by classifying categories of the hand poses according to the number of unfolded fingers.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for recognizing a user's gesture for carrying out an operation of a vehicle, comprising:
    an image generator configured to generate an object image by photographing a user's hand;
    a feature point candidate detector configured to generate a hand image including a hand region by eliminating a background of the object image, and detect a center point of a wrist and feature point candidates including fingertips and finger valleys, wherein the feature point candidate detector detects an outline of the user's hand, and detects the fingertips or the finger valleys based on a curvature of the outline of the user's hand;
    a palm detector configured to detect a palm region by performing a morphology operation on the hand region, and detect a center point of the palm region, wherein the palm detector performs an erosion operation along the outline of the user's hand to eliminate the finger region, performs a dilation operation along an outline of the palm region remaining after being partially eliminated by the erosion operation to dilate the palm region, and detects a center point of the dilated palm region by using an ellipse matching method or a least squares method;
    a finger detector configured to detect a finger region by eliminating the palm region from the hand region;
    a feature point detector configured to detect the finger valleys located within the palm region and the fingertips located within the finger region as feature points, and generate a hand model by using the center point of the wrist, the center point of the palm region, and the feature points; and
    a gesture recognizer configured to recognize a number of unfolded fingers based on the hand model, and recognize the user's gesture by selecting a category that corresponds to the number of unfolded fingers among a plurality of categories.

2. The apparatus of claim 1, wherein the feature point candidate detector converts the hand image to a binary image.

3. The apparatus of claim 2, wherein the feature point candidate detector normalizes the hand region after converting the hand image to the binary image or after detecting the feature point candidates.

4. The apparatus of claim 1, wherein the feature point candidate detector detects points where the curvature is greater than a predetermined value as the fingertips or the finger valleys.

5. The apparatus of claim 1, wherein finger detector detects the finger region by eliminating the dilated palm region from the hand region.

6. The apparatus of claim 1, wherein the feature point detector detects the feature point candidates located within the palm region or the finger region by primarily filtering the feature point candidates.

7. The apparatus of claim 6, wherein the feature point detector detects the feature points by secondarily filtering the primarily filtered feature point candidates based on distances and angles between the center point of the wrist, the center point of the palm region, and the primarily filtered feature point candidates.

8. The apparatus of claim 1, wherein the gesture recognizer selects a hand pose that corresponds to the hand model in the selected category.

9. A method for recognizing a user's gesture for carrying out an operation of a vehicle, comprising:
generating a hand image by eliminating a background of an object image;
converting the hand image to a binary image including a hand region;
detecting a center point of a wrist and feature point candidates including fingertips and finger valleys within the hand region, and further comprising:
  detecting an outline of a user's hand; and
  calculating a curvature of the outline of the user's hand;
detecting a palm region and a center point of the palm region by performing a morphology operation on the hand region, and further comprising:
  performing an erosion operation along the outline of the user's hand to eliminate the finger region;
  performing an dilation operation along an outline of the palm region remaining after being partially eliminated by the erosion operation to dilate the palm region; and
  detecting the center point of the dilated palm region by using an ellipse matching method or a least squares method;
detecting a finger region by eliminating the palm region from the hand region;
detecting the feature point candidates located within the palm region or the finger region by primarily filtering the feature point candidates;
detecting feature points by secondarily filtering the primarily filtered feature point candidates based on distances and angles between the center point of the wrist, the center point of the palm region, and the primarily filtered feature point candidates; and
generating a hand model by using the center point of the wrist, the center point of the palm region, and the feature points.

10. The method of claim 9, further comprising normalizing the hand region after the converting the hand image or after the detecting the center point of the wrist and feature point candidates.

11. The method of claim 9, wherein the detecting the center point of the wrist and the feature point candidates further comprises detecting points where the curvature is greater than a predetermined value as the fingertips or the finger valleys.

12. The method of claim 9, wherein the detecting the finger region comprises eliminating the dilated palm region from the hand region.

13. The method of claim 9, further comprising:
recognizing a number of unfolded fingers based on the hand model;
selecting a category that corresponds to the number of unfolded fingers among a plurality of categories; and
recognizing the user's gesture by selecting a hand pose that corresponds to the hand model in the selected category.

14. A non-transitory computer readable medium containing program instructions executed by a processor or controller, the computer readable medium comprising:
program instructions that generate a hand image by eliminating a background of an object image;
program instructions that convert the hand image to a binary image including a hand region;
program instructions that detect a center point of a wrist and feature point candidates including fingertips and finger valleys within the hand region, and further comprising:
  detecting an outline of a user's hand; and
  calculating a curvature of the outline of the user's hand;
program instructions that detect a palm region and a center point of the palm region by performing a morphology operation on the hand region, and further comprising:
  performing an erosion operation along the outline of the user's hand to eliminate the finger region;
  performing an dilation operation along an outline of the palm region remaining after being partially eliminated by the erosion operation to dilate the palm region; and
  detecting the center point of the dilated palm region by using an ellipse matching method or a least squares method;
program instructions that detect a finger region by eliminating the palm region from the hand region;
program instructions that detect the feature point candidates located within the palm region or the finger region by primarily filtering the feature point candidates;
program instructions that detect feature points by secondarily filtering the primarily filtered feature point candidates based on distances and angles between the center point of the wrist, the center point of the palm region, and the primarily filtered feature point candidates; and
program instructions that generate a hand model by using the center point of the wrist, the center point of the palm region, and the feature points.

* * * * *